United States Patent
Van Swearingen

(10) Patent No.: US 9,614,340 B2
(45) Date of Patent: Apr. 4, 2017

(54) CYLINDRICAL SURFACE SPIN WELD APPARATUS

(75) Inventor: Kendrick Van Swearingen, Woodridge, IL (US)

(73) Assignee: CommScope Technologies LLC, Hickory, NC (US)

( * ) Notice: Subject to any disclaimer, the term of this patent is extended or adjusted under 35 U.S.C. 154(b) by 1054 days.

(21) Appl. No.: 13/070,934

(22) Filed: Mar. 24, 2011

(65) Prior Publication Data

US 2012/0125513 A1    May 24, 2012

Related U.S. Application Data

(63) Continuation-in-part of application No. 12/962,943, filed on Dec. 8, 2010, now Pat. No. 8,302,296, which
(Continued)

(51) Int. Cl.
    *B23P 19/00*    (2006.01)
    *H01R 43/20*    (2006.01)
    (Continued)

(52) U.S. Cl.
    CPC ........... *H01R 43/02* (2013.01); *B29C 65/069* (2013.01); *B29C 65/0672* (2013.01);
    (Continued)

(58) Field of Classification Search
    CPC ..... H01R 9/05; H01R 4/625; Y10T 29/49123; Y10T 29/49179; Y10T 29/53; Y10T 29/5313; Y10T 29/53209; Y10T 29/53235; B29C 65/645

USPC ...... 29/747, 566.4, 745, 762, 764, 825, 860, 29/876, 882; 156/47, 73.5, 366, 368, 433, 156/580; 439/578, 583, 584
See application file for complete search history.

(56) References Cited

U.S. PATENT DOCUMENTS

| | | |
|---|---|---|
| 3,245,027 A | 4/1966 | Ziegler, Jr. |
| 3,693,238 A | 9/1972 | Hoch et al. |

(Continued)

FOREIGN PATENT DOCUMENTS

| | | |
|---|---|---|
| CN | 1623254 | 6/2005 |
| CN | 102610973 | 7/2012 |

(Continued)

OTHER PUBLICATIONS

Jae Hyun So, International Search Report from related PCT filing PCT/US/2011/046052, Seo-Gu, Daejeon, Republic of South Korea, Mar. 27, 2012.
(Continued)

*Primary Examiner* — Thiem Phan
(74) *Attorney, Agent, or Firm* — Myers Bigel, P.A.

(57) ABSTRACT

A spin weld apparatus for spin welding a prepared end of a coaxial cable with a coaxial connector includes a cable clamp dimensioned to grip the coaxial cable and a drive collet dimensioned to enclose and rotationally interlock with a lateral surface of the coaxial connector. The drive collet is dimensioned to rotationally interlock with an interlocking portion of a spin welder. The spin welder is dimensioned to axially align the coaxial connector with the coaxial cable for spin welding when the drive collet is rotationally interlocked with the spin welder.

14 Claims, 15 Drawing Sheets

Related U.S. Application Data is a continuation-in-part of application No. 12/951,558, filed on Nov. 22, 2010, now Pat. No. 8,826,525.

(51) Int. Cl.
| | |
|---|---|
| *H01R 43/02* | (2006.01) |
| *H01R 9/05* | (2006.01) |
| *H01R 24/40* | (2011.01) |
| *B29C 65/06* | (2006.01) |
| *B29C 65/78* | (2006.01) |
| *B29C 65/00* | (2006.01) |
| *H01R 103/00* | (2006.01) |
| *B29L 31/34* | (2006.01) |

(52) U.S. Cl.
CPC .......... *B29C 65/7841* (2013.01); *B29C 66/32* (2013.01); *B29C 66/526* (2013.01); *B29C 66/5344* (2013.01); *H01R 9/05* (2013.01); *H01R 24/40* (2013.01); *B29L 2031/3462* (2013.01); *H01R 2103/00* (2013.01); *Y10T 29/53209* (2015.01); *Y10T 29/53235* (2015.01)

(56) References Cited

U.S. PATENT DOCUMENTS

| | | | |
|---|---|---|---|
| 3,728,781 A | 4/1973 | Curtis et al. | |
| 3,897,896 A | 8/1975 | Louw et al. | |
| 3,897,897 A | 8/1975 | Satzler et al. | |
| 3,917,497 A | 11/1975 | Stickler | |
| 4,090,898 A | 5/1978 | Tuskos | |
| 4,226,652 A | 10/1980 | Berg | |
| 4,353,761 A | 10/1982 | Woerz et al. | |
| 4,457,795 A | 7/1984 | Mason et al. | |
| 4,521,642 A | 6/1985 | Vives | |
| 4,534,751 A | 8/1985 | Fortuna et al. | |
| 4,584,037 A | 4/1986 | Fortuna et al. | |
| 4,741,788 A | 5/1988 | Clark et al. | |
| 4,743,331 A | 5/1988 | Nuttall et al. | |
| 5,064,485 A | 11/1991 | Smith et al. | |
| 5,154,636 A | 10/1992 | Vaccaro | |
| 5,284,449 A | 2/1994 | Vaccaro | |
| 5,796,315 A | 8/1998 | Gordon et al. | |
| 6,007,378 A | 12/1999 | Oeth | |
| 6,093,043 A | 7/2000 | Gray | |
| 6,105,849 A | 8/2000 | Mochizuki et al. | |
| 6,210,222 B1 * | 4/2001 | Langham et al. | 439/583 |
| 6,632,118 B2 | 10/2003 | Jacob | |
| 6,793,095 B1 | 9/2004 | Dulisse et al. | |
| 6,832,785 B1 | 12/2004 | Zitkovic | |
| 7,677,812 B2 | 3/2010 | Castagna | |
| 7,705,238 B2 | 4/2010 | Van Swearingen | |
| 7,754,038 B2 | 7/2010 | Ripplinger et al. | |
| 7,806,444 B2 | 10/2010 | Blivet et al. | |
| 7,823,763 B2 | 11/2010 | Sachdev et al. | |
| 8,174,132 B2 | 5/2012 | Van Swearingen | |
| 2003/0137372 A1 | 7/2003 | Fehrenbach et al. | |
| 2007/0259565 A1 | 11/2007 | Holland | |
| 2011/0239451 A1 * | 10/2011 | Montena et al. | 29/747 |

FOREIGN PATENT DOCUMENTS

| | | |
|---|---|---|
| EP | 2 219 267 A1 | 8/2010 |
| JP | 11-329658 | 11/1999 |
| JP | 2000-084680 | 3/2000 |
| JP | 2002310117 A | 10/2002 |
| JP | 2008-155238 | 7/2008 |

OTHER PUBLICATIONS

Dupont, "General Design Principles for DuPont Engineering Polymers (Design guide—Module I)", Internet Citation, 2000, page complete, XP007904729, Retrieved from the Internet: URL:http://plastics.dupont.com/plastics/pdflit/americas/general/H76838.pdf [retrieved on May 16, 2008] * Chapter 11; pp. 77-90.

* cited by examiner

CYLINDRICAL SURFACE SPIN WELD APPARATUS

CROSS REFERENCE TO RELATED APPLICATIONS

This application is a continuation-in-part of commonly owned co-pending U.S. Utility patent application Ser. No. 12/962,943, titled "Friction Weld Coaxial Connector and Interconnection Method", filed Dec. 8, 2010 by Kendrick Van Swearingen, currently pending and hereby incorporated in its entirety, which is a continuation-in-part of commonly owned co-pending U.S. patent application Ser. No. 12/951,558, titled "Laser Weld Coaxial Connector and Interconnection Method", filed Nov. 22, 2010 by Ronald A. Vaccaro, Kendrick Van Swearingen, James P. Fleming, James J. Wlos and Nahid Islam, currently pending and hereby incorporated by reference in its entirety.

BACKGROUND

Field of the Invention

This invention relates to a spin welding apparatus. More particularly, the invention relates to an apparatus for spin welding between coaxial cylindrical surfaces.

Description of Related Art

Apparatus for spin welding, a type of friction welding, are typically designed for spin welding objects of similar materials, such as polymer material. Such apparatus are generally provided with means for securely holding one object stationary while a mating object is secured for rotation. Spin welding apparatus are also generally designed to facilitate advancement/retraction of at least one object with respect to the other object, bringing the object pairs together for spin welding and retracting the apparatus for easy exchange of the welded object pair for the next object pair to be spin welded together.

Prior spin welding apparatus have also been designed for spin welding objects composed of dissimilar materials. One method for spin welding dissimilar materials has been to dimension an object for spin welding with a flange and/or containment area with oversized dimensions for retention of softened/molten material generated along the contact surfaces during the spin welding process. However, oversized object dimensions require additional material, increasing the cost of manufacture and resulting in a finished product with oversized dimensions.

Competition in the spin welding apparatus market has focused attention on improving performance while reducing production costs, both of the apparatus itself and of the objects to be spin welded. Therefore, it is an object of the invention to provide a spin welding apparatus and method of use that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
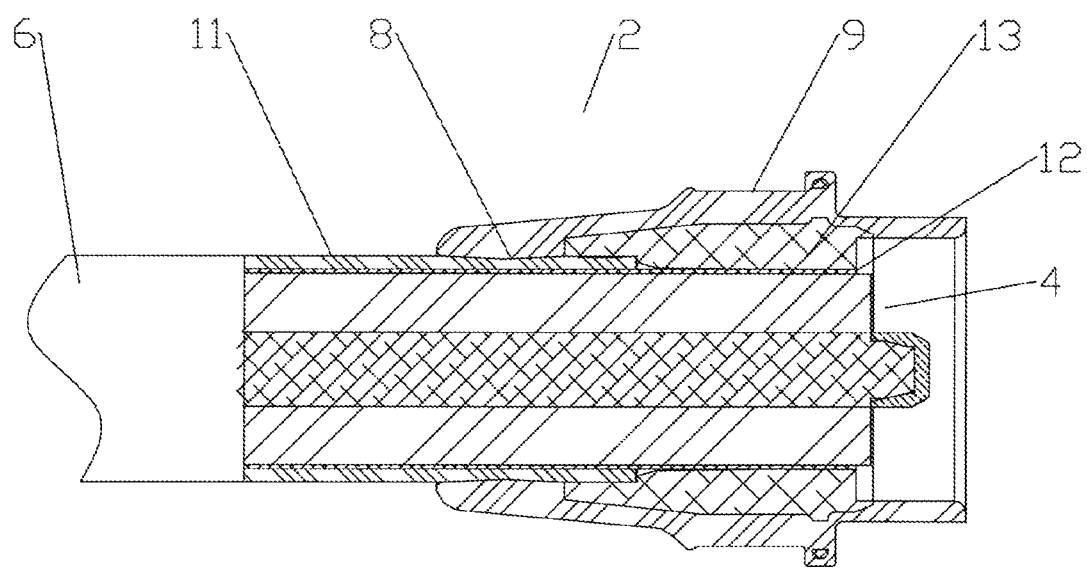
FIG. 1 is a schematic cross-section view of a coaxial connector coupled with a coaxial cable for spin welding and laser welding.

Coaxial cables for the transmission of radio frequency signals are terminated with coaxial connectors for ease of interconnection with further coaxial cables and/or other equipment. These coaxial connectors may be coupled to the prepared coaxial cable end in part or entirely via spin welding. As shown for example in FIG. 1, a coaxial connector 2 generally as disclosed in U.S. patent application Ser. No. 12/951,558, filed Nov. 22, 2010, may be dimensioned for interconnection with a prepared end 4 of a coaxial cable 6 via a combination of spin welding and laser welding. For spin welding, a polymer material overbody 9 may be provided with a cylindrical friction surface 8 along an inner diameter of the coaxial connector 2 for spin welding with the outer diameter of a polymer outer jacket 11 of the coaxial cable 6. After spin welding, the metal outer conductor 12 of the coaxial cable 6 may be laser welded to the metal connector body 13, at the connector end, in a separate manufacturing step.

Figure 2:
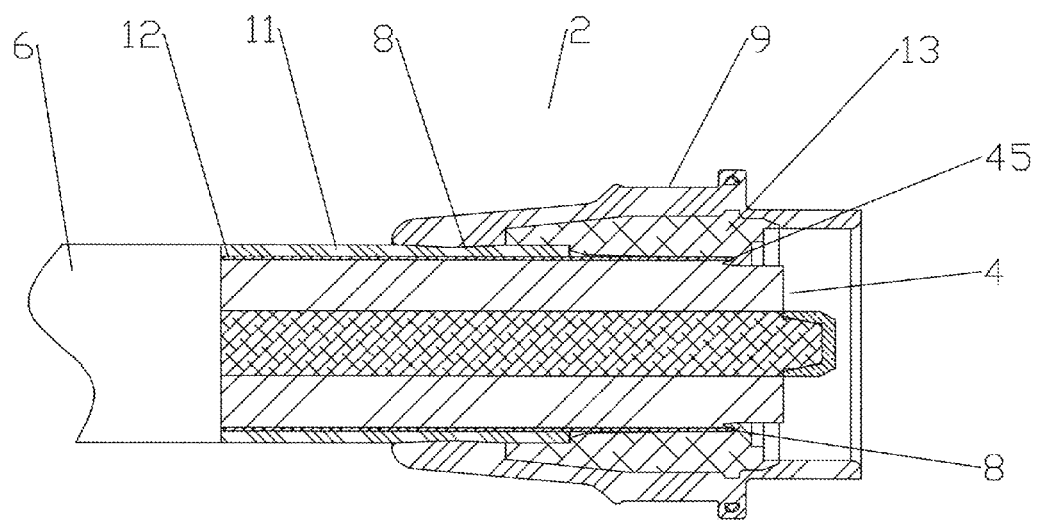
FIG. 2 is a schematic cross-section view of an alternative embodiment of a coaxial connector coupled with a coaxial cable for spin welding.
Figure 3:
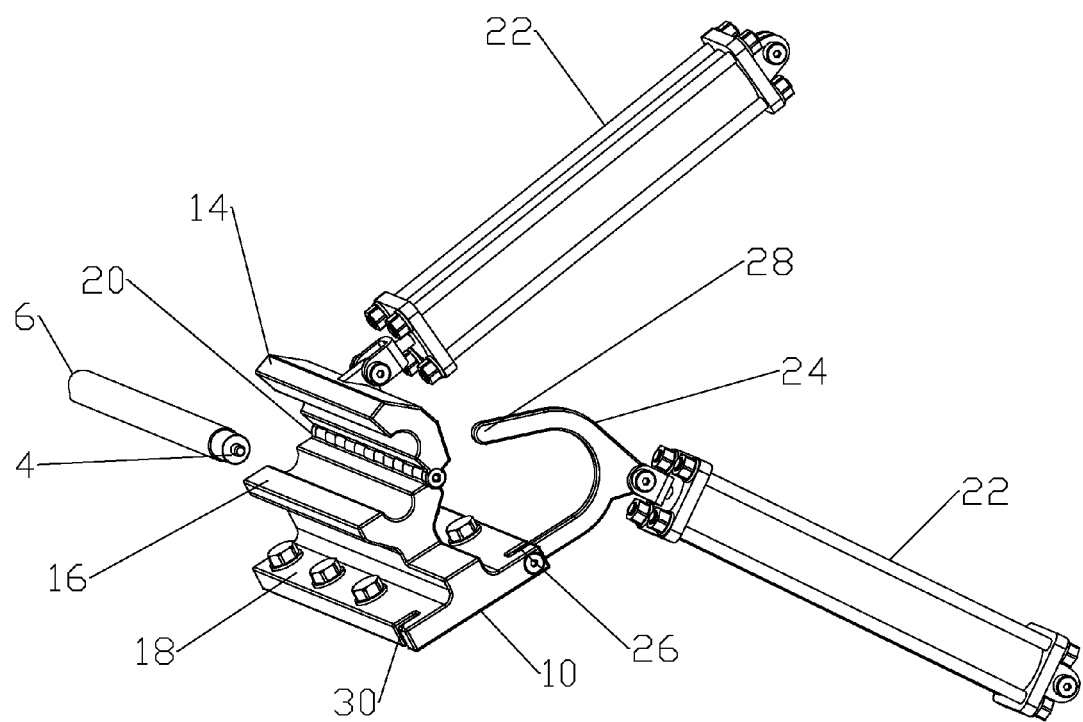
FIG. 3 is a schematic isometric view of a cable clamp of an exemplary spin weld apparatus prior to seating a coaxial cable within the cable clamp.

Alternatively, as shown for example in FIG. 2, a coaxial connector 2, generally as disclosed for example in U.S.

patent application Ser. No. 12/962,943, filed Dec. 8, 2010, may be dimensioned for interconnection via spin welding only. The spin welding surfaces include a cylindrical friction surface 8 along an inner diameter of a polymer material portion of the overbody 9 for spin welding with the outer diameter of the polymer outer jacket 11 of the coaxial cable 6. Also, an additional friction surface 8 is provided in a groove of the inner diameter of the metal connector body 13 of the coaxial connector 8, dimensioned to receive the metal outer conductor 12 of the coaxial cable 6 for simultaneous spin welding therewith.

The inventor has recognized that when spin welding along an extended cylindrical surface, the entirety of the desired spin weld surface(s) may not be simultaneously exposed to the same amount of friction, resulting in uneven friction during spin welding. When uneven friction is present, a portion of one object may begin to overheat before a corresponding portion of a mating object has reached a desired spin welding temperature. Further, where multiple spin weld surface pairs of different materials and therefore different thermal characteristics are present, the likelihood of uneven heating is significantly increased. When uneven heating occurs, the spin welding process may be required to continue in the presence of molten material, which may result in an undesired radial dispersal of softened and/or molten material under the influence of centrifugal force, interfering with the spin welding process and/or or degrading resulting spin weld quality.

The inventor has further recognized that molten material may be contained during the spin welding process by enclosing at least one of the objects within a longitudinally enclosing drive collet. Thereby, spin welding along mating cylindrical surfaces with a significant longitudinal extent coaxial with the axis of rotation and/or simultaneously between different material mating surface pairs having different melt characteristics may be performed with reduced chance of generating an unacceptable spin weld quality.

FIGS. 3-11 demonstrate an exemplary embodiment of a spin weld apparatus 2 and the several steps of a method of use of the apparatus. The spin weld apparatus 2 is used to spin weld, for example, a prepared end 4 of a coaxial cable 6 with a coaxial connector 8. As shown best shown in FIGS. 3-5, the spin weld apparatus 2 is provided with a cable clamp 10 dimensioned to securely rotationally and longitudinally grip the outer diameter of the coaxial cable 6.

The cable clamp 10 may be provided with clamp surfaces such as a top cable clamp portion 14 movably coupled with a bottom cable clamp portion 16, such as by pivoting, vertical or horizontal displacement. The cable clamp 10 may be configured for ease of mounting, for example via a cable clamp base 18 coupled with the bottom cable clamp portion 16. The top cable clamp portion 14 may be pivotally coupled with the bottom cable clamp portion 16 via a hinge 20 along one side, as shown in FIG. 1. An actuator 22 or the like may be movably coupled with the top cable clamp portion 14 operable to pivot or otherwise move the top cable clamp portion 14 between open and closed positions with respect to the bottom cable clamp portion 16. An extended longitudinal extent of the cable clamp 10 enables distribution of the gripping force applied, such that suitable gripping force may be applied, but the coaxial cable 6 is not deformed or otherwise damaged.

Figure 4:
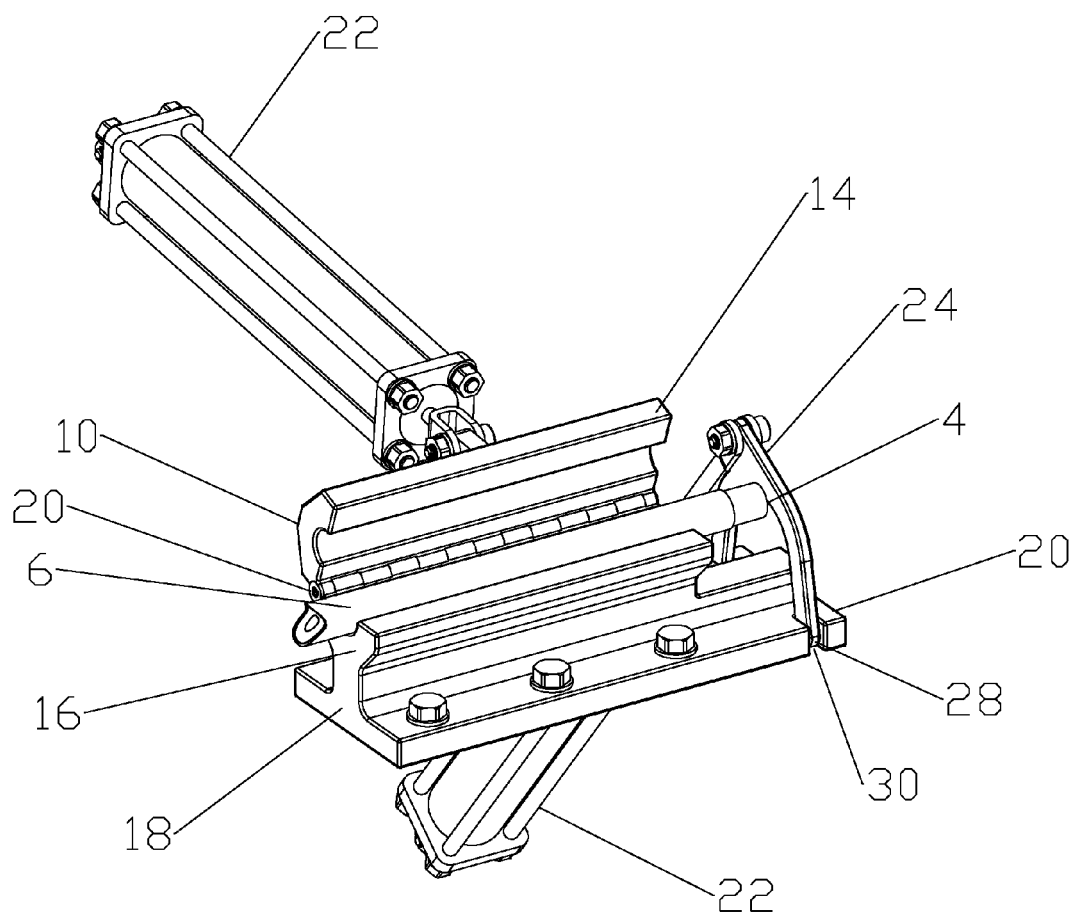
FIG. 4 is a schematic, isometric view of the cable clamp of FIG. 3 with a coaxial cable seated within the cable clamp (clamp open) abuting the cable stop.
Figure 5:
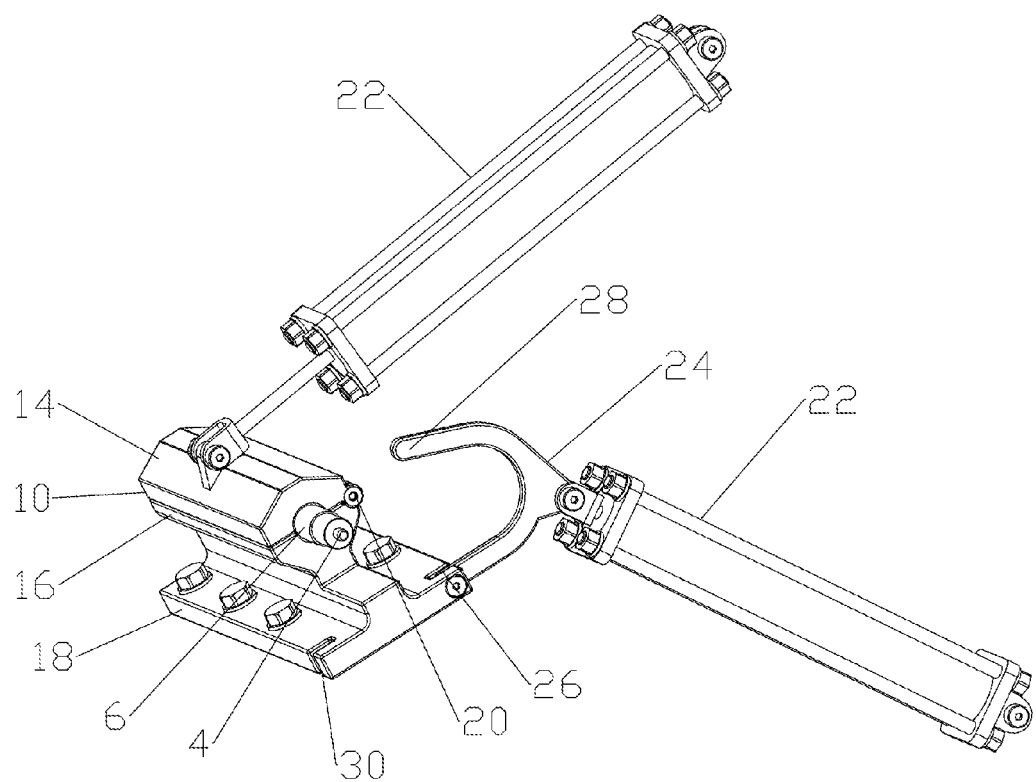
FIG. 5 is a schematic isometric view of the cable clamp of FIG. 3 with the coaxial cable within the cable clamp and the cable stop opened.

As best shown in FIG. 4, the spin weld apparatus 2 may be provided with a stop 24 for stopping a prepared end 4 of the coaxial cable 6 at a predefined longitudinal extension from the end of the cable clamp 10. The stop 24 may be provided with a pivot end 26 pivotally coupled with the cable clamp base 18 and an attachment end 28 interlockable with the cable clamp base 18, for example via insertion into a slot 30 of the base 18. The stop 24 is dimensioned to stop the coaxial cable 6 at a predefined longitudinal position within the clamp 10 such that the prepared end 4 is located at a known position with respect to the spin welder 36 (see FIG. 8). Thereby, a known longitudinal extension of the spin welder 36 towards the cable clamp 10 will generate a repeatable spin welding result. An actuator 22 operable to pivot the stop 24 with respect to the cable clamp base 18 may be coupled with the stop 24 to provide quick insertion and removal of the stop 24 so that each coaxial cable 6 may be quickly and repeatably inserted into the same longitudinal position within the cable clamp 10. Alternatively, the stop 24 may be arranged to move, for example, vertically or horizontally in and out of the desired prepared end 4 abutting position or a spaced away position allowing the approach of the spin welder 16 to the prepared end 4.

Figure 6:
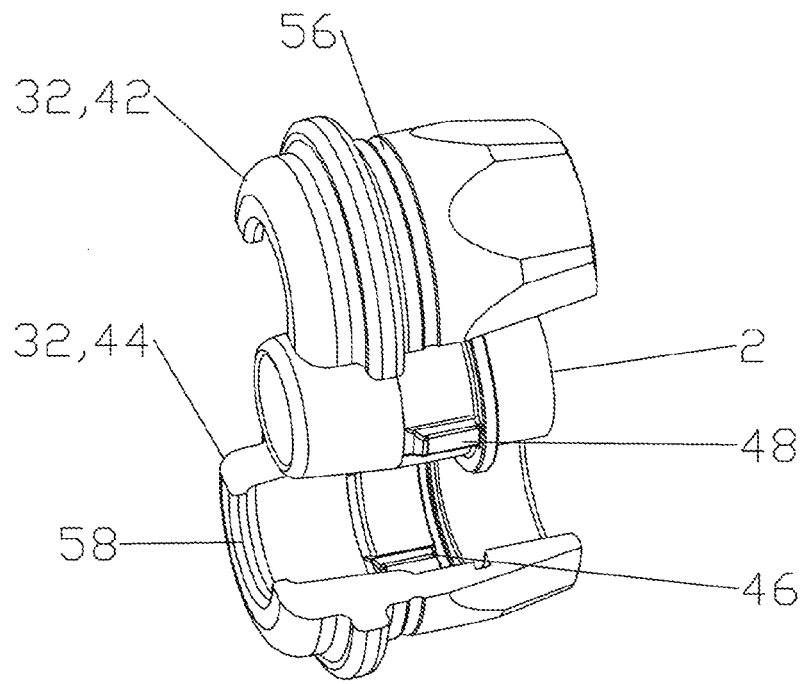
FIG. 6 is a schematic isometric exploded view of a drive collet of the exemplary spin weld apparatus and a coaxial connector.
Figure 7:
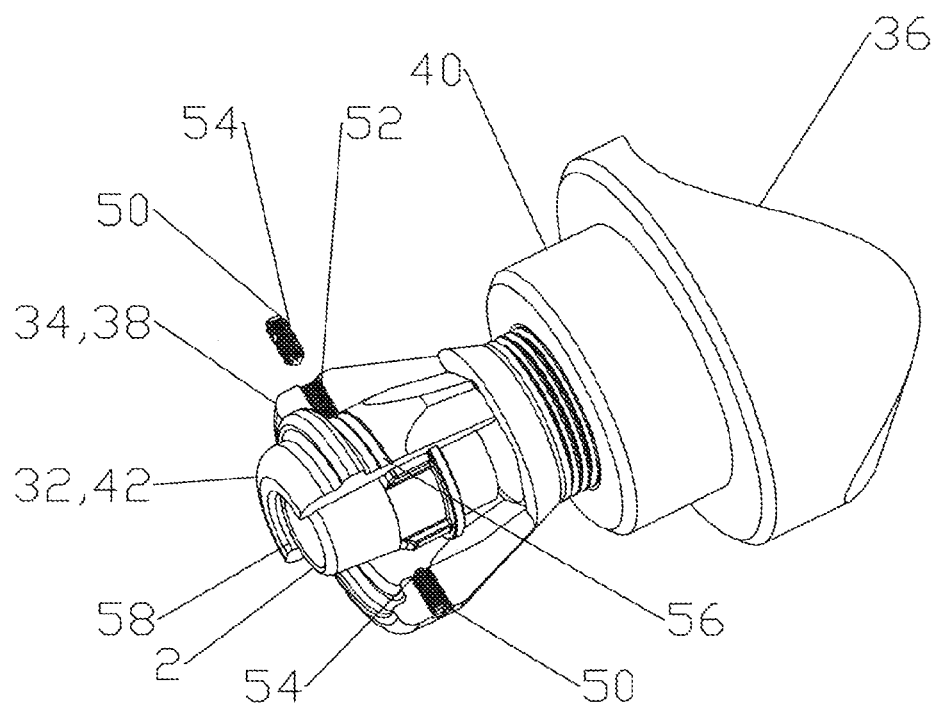
FIG. 7 is a schematic isometric partial cut-away view of the drive collet and coaxial connector of FIG. 6 coupled with a spin welder of the exemplary spin weld apparatus.
Figure 8:
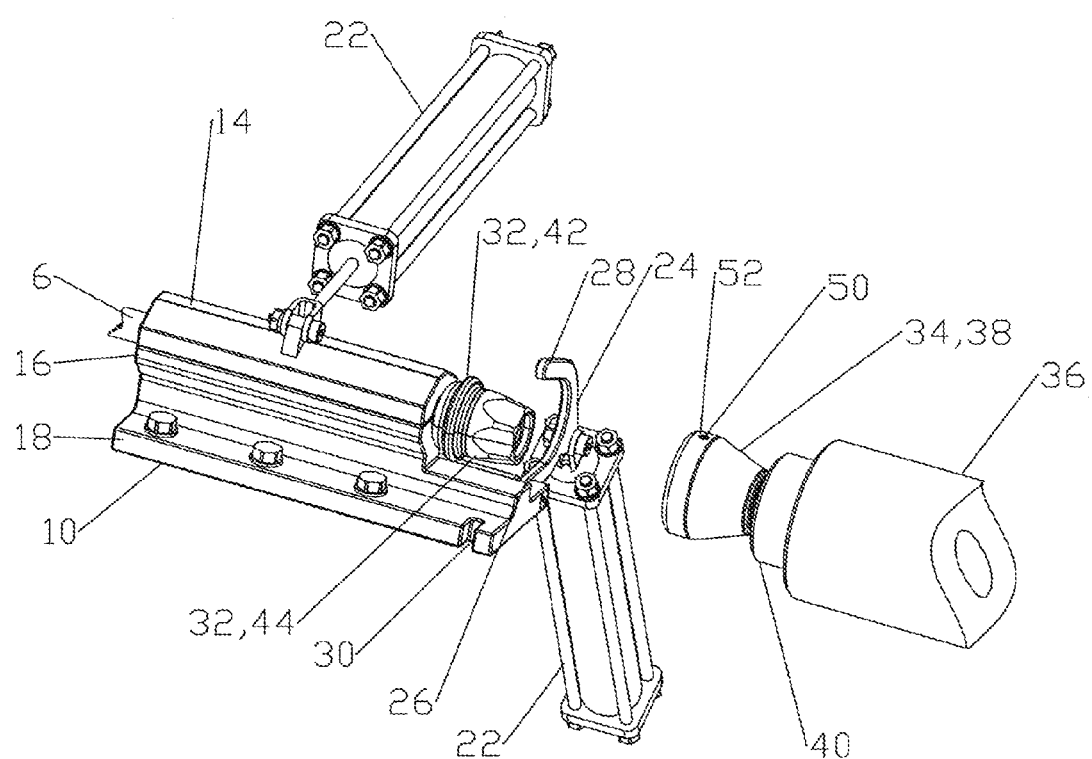
FIG. 8 is a schematic isometric view of the exemplary spin weld apparatus subsequent to spin welding and retraction of the spin welder.
Figure 9:
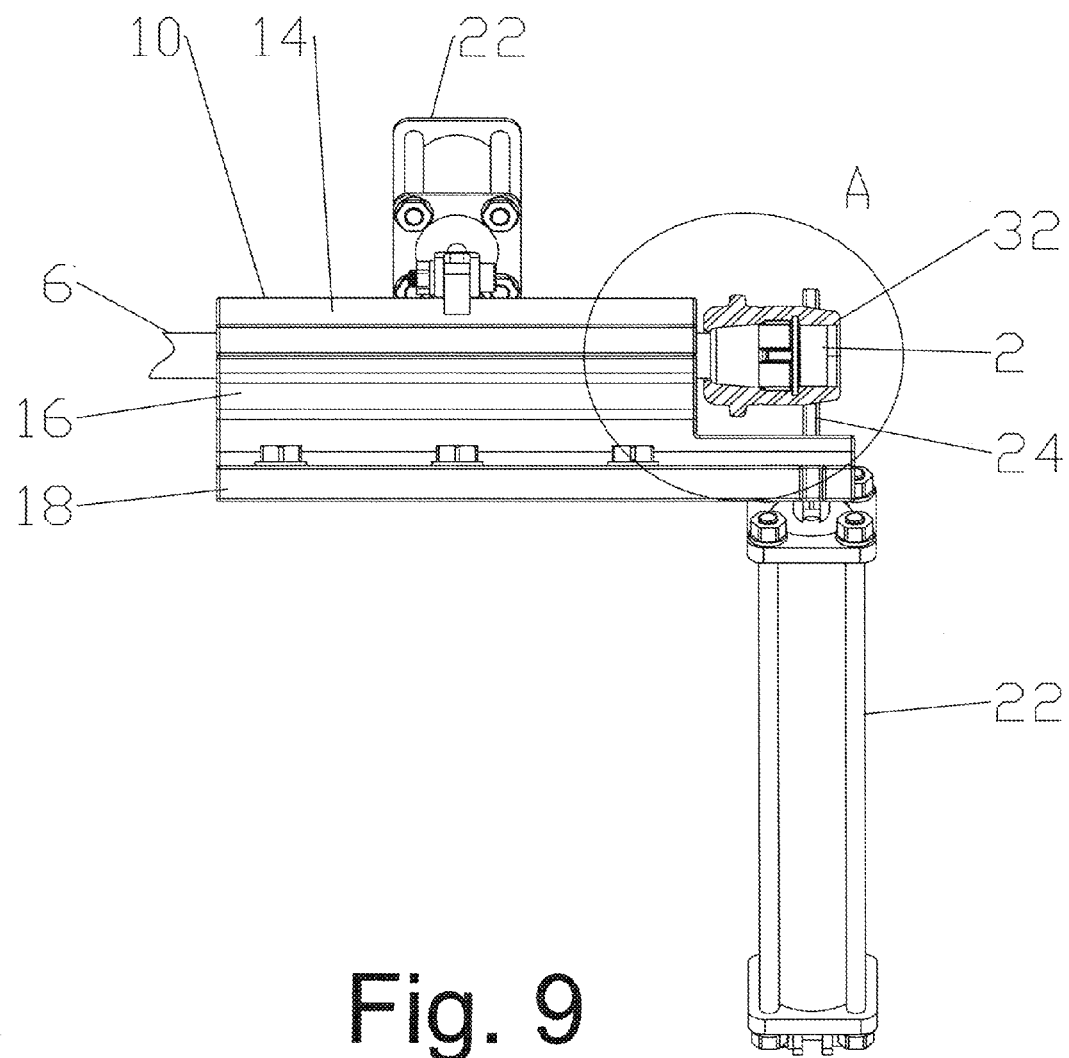
FIG. 9 is a schematic side view of the exemplary spin weld apparatus with a cross section view of the drive collet.

As best shown in FIGS. 6-8, the spin weld apparatus 2 is also provided with a drive collet 32 dimensioned to enclose and rotationally interlock with the coaxial connector 2 along an outer diameter and the longitudinal extent of the coaxial connector 2.

The drive collet 32 is dimensioned to removably rotationally interlock with an interlocking portion 34 of a spin welder 36 (not shown in its entirety). The spin welder 36 is dimensioned to axially align the coaxial connector 2 with the coaxial cable 6 for spin welding when the drive collet 32 is rotationally interlocked with the spin welder 36. The interlocking portion 34 may, for example, be a spindle socket 38. The spindle socket 38 may be coupled with a spindle 40 of the spin welder 36.

As shown in FIG. 6, the drive collet 32 may be provided with at least two separable collet portions, for example, a first collet portion 42 and a second collet portion 44. The first and second collet portions 42, 44 cooperate to surround the outer diameter of the coaxial connector 2 and rotationally interlock with the coaxial connector 2, for example via interlock slots 46 dimensioned to seat upon corresponding support ridges 48 of the coaxial connector 2.

Seated upon the coaxial connector 2, for example as shown in FIG. 7, the first and second collet portions 42, 44 together form the drive collet 32, which rotationally interlocks with the interlocking portion 34, here via insertion and rotational interlock with a spindle socket 38 of the spin welder 36. For secure retention/quick release, the spindle socket 38 may be provided with a releasable grip mechanism such as a plurality of spring detent screws 50 threaded into corresponding spring detent screw aperture(s) 52 spaced around the spindle socket 38. The spring detent screws 50 may be provided with an inner spring (not shown) and a ball bearing 54 at one end. The ball bearing 54 snaps into a detent groove 56 or the like of the drive collet outer diameter, releasably retaining the drive collet 32 in the interlocking portion 34 according to the inner spring characteristics of the spring detent screws 50.

Figure 10:
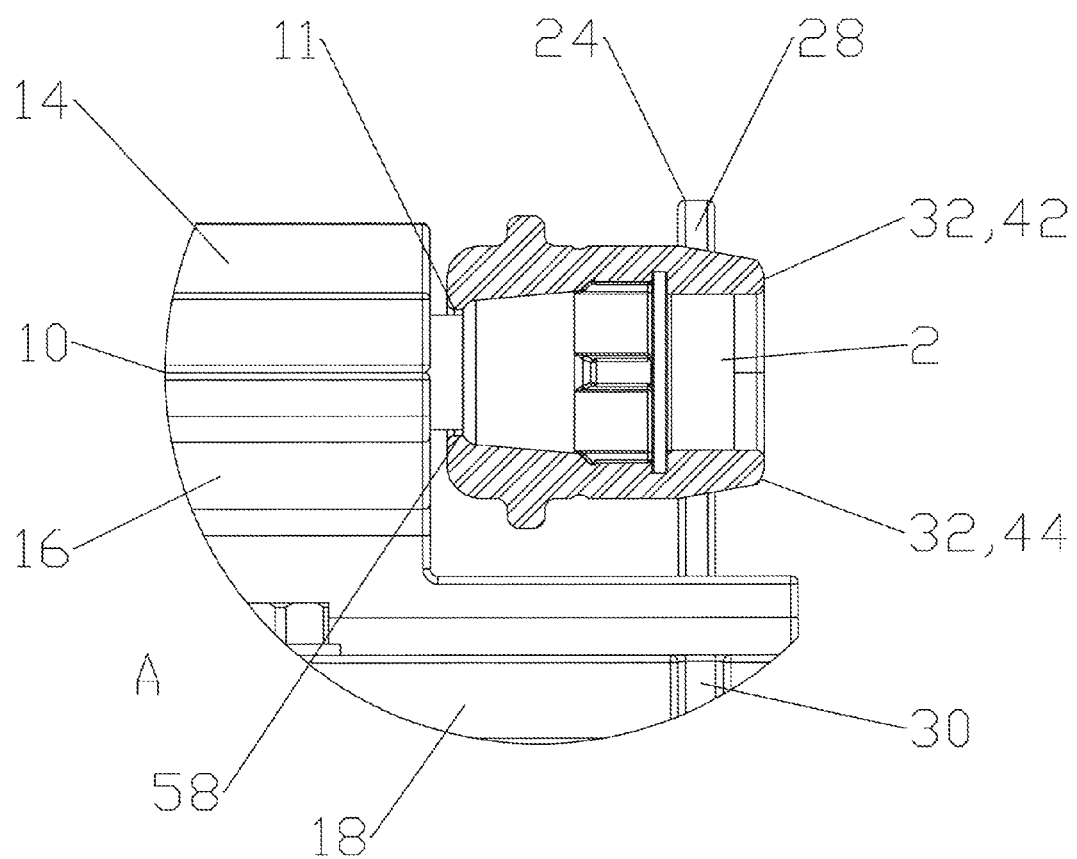
FIG. 10 is an enlarged view of area A of FIG. 9.
Figure 11:
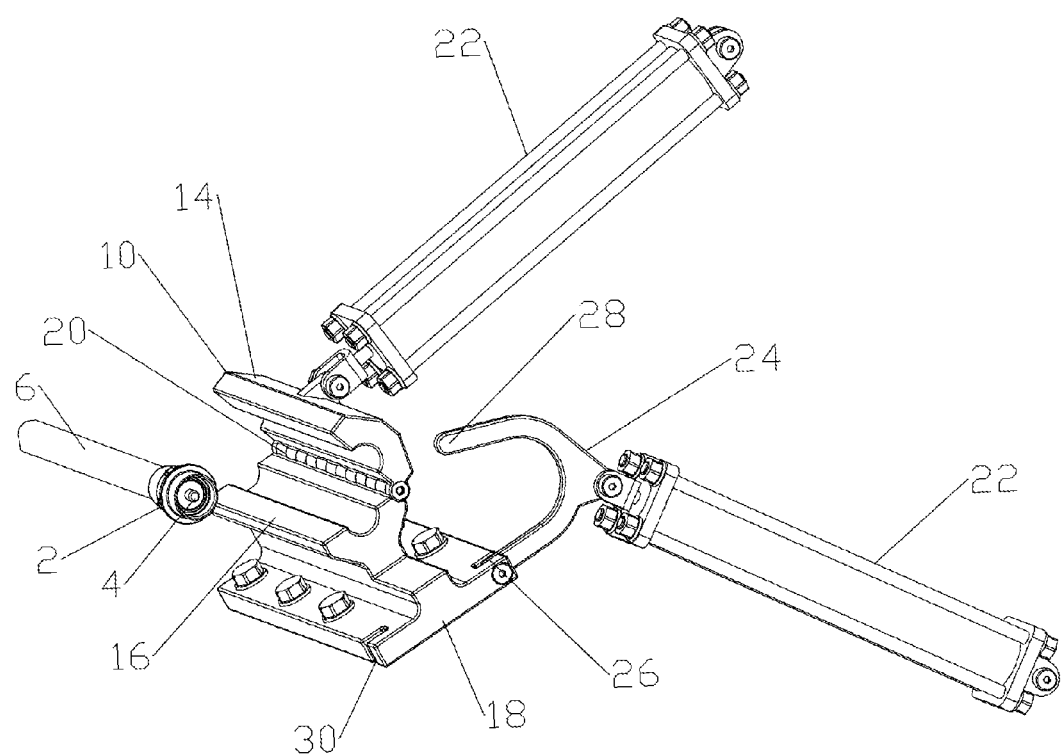
FIG. 11 is a schematic isometric view of the cable clamp of FIG. 3 demonstrating the end of spin welding interconnection sequence removal of a coaxial cable with a spin welded coaxial connector attached.

As best shown in FIG. 10, an end of the drive collet 32 facing the cable clamp 10, when the spin welder 36 is longitudinally aligned with the prepared end 4 of the coaxial cable 6, may be provided with a collet flange 58 extending radially inward short of contacting the coaxial cable 6 to further assist with the retention of softened and/or molten material within the drive collet 32 resulting from spin welding.

As an exemplary method for using the spin weld apparatus embodiment of FIGS. 3-11, a slidable coupling nut (not shown) of a coaxial cable 6 is slid back over the coaxial cable 6 away from the prepared end 4 of the coaxial cable 6. The stop 24 is pivoted to couple the attachment end 28 with the cable clamp base 18. With the cable clamp 10 pivoted open, the coaxial cable 6 is seated within the bottom cable clamp portion 16 and positioned with the prepared end 4 abutting the stop 24 and the cable clamp 10 closed to secure the coaxial cable 6. The stop 24 is then pivoted back, uncoupling the attachment end 28 from the slot 30, to remove the stop 24 from obstructing the prepared end 4 during spin welding.

The first collet portion 42 is coupled with the second collet portion 44, around the coaxial connector 2, to enclose and rotationally interlock a lateral surface of the coaxial connector 2 within the drive collet 32. The lateral surface includes at least an outer diameter of the coaxial connector 2. The drive collet 32 with the coaxial connector 8 is seated within, inserted into and rotationally interlocked with the spindle socket 18, rotationally interlocking the coaxial connector 2 with the spindle 19 of the spin welder 36. The spin welder 36 is brought together with the cable clamp 10, inserting the prepared end 4 into an inner diameter of the coaxial connector 8.

With the prepared end 4 within the coaxial connector 2, the spin welder 36 is engaged to spin the drive collet 32 and the coaxial connector 2. Depending upon the type of coaxial connector 2 being applied, the spin welder 16 may rotate only and/or rotate and advance longitudinally towards the prepared end 4. Once the spin welding process has produced a desired degree of heat and friction, spinning of the spin welder 36 is stopped and a cooling period observed. The spin welder 36 is then retracted, the drive collet 32 disengaging from the spindle socket 38 as the coaxial connector 2 is now secured upon the coaxial cable 6, overcoming the spring detent screw 50 release force between the drive collet 32 and the spindle socket 38. The first collet portion 42 and the second collet portion 44 are then separated and removed from the coaxial connector 2. The cable clamp 10 is opened and the coaxial cable 6 with the coaxial connector 2 spin welded thereon is removed.

In further embodiments, the drive collet 32 may be configured with the capability of dynamically applying a variable level of radial inward compression upon desired portions of the coaxial connector 2, during the spin welding procedure.

Figure 12:
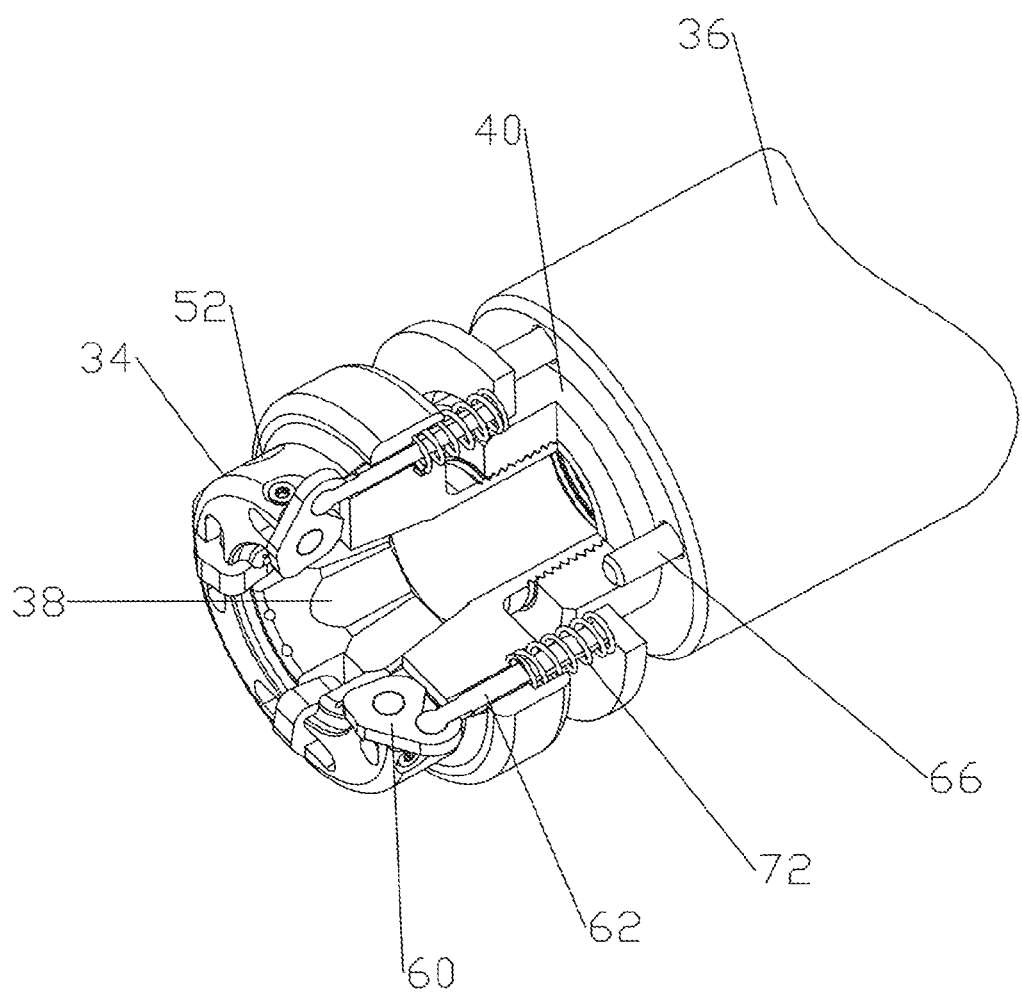
FIG. 12 is a partial cut-away schematic isometric view of an alternative embodiment of a spin welder provided with radial inward drive collet actuation capability.

As shown in FIGS. 12-16, the interlocking portion 34 may be similarly provided with a spindle socket 38. The interlocking portion 34 has the additional functionality of selective radial inward pressure via a plurality of cam(s) 60 pivotably retained by upon the interlocking portion 34. As best shown in FIG. 12, the cam(s) 60 are arranged spaced apart around the periphery of the spindle socket 38. Each cam 60 may be coupled to a pivot pin 62 coupled to a drive plate 64 longitudinally actuated by drive pins 66 of the spin welder 36. The drive pins 66 may be electro-mechanically, hydraulically and/or mechanically actuated based upon, for example, spindle rotation speed, time, temperature and/or longitudinal position of the spindle 40.

Figure 13:
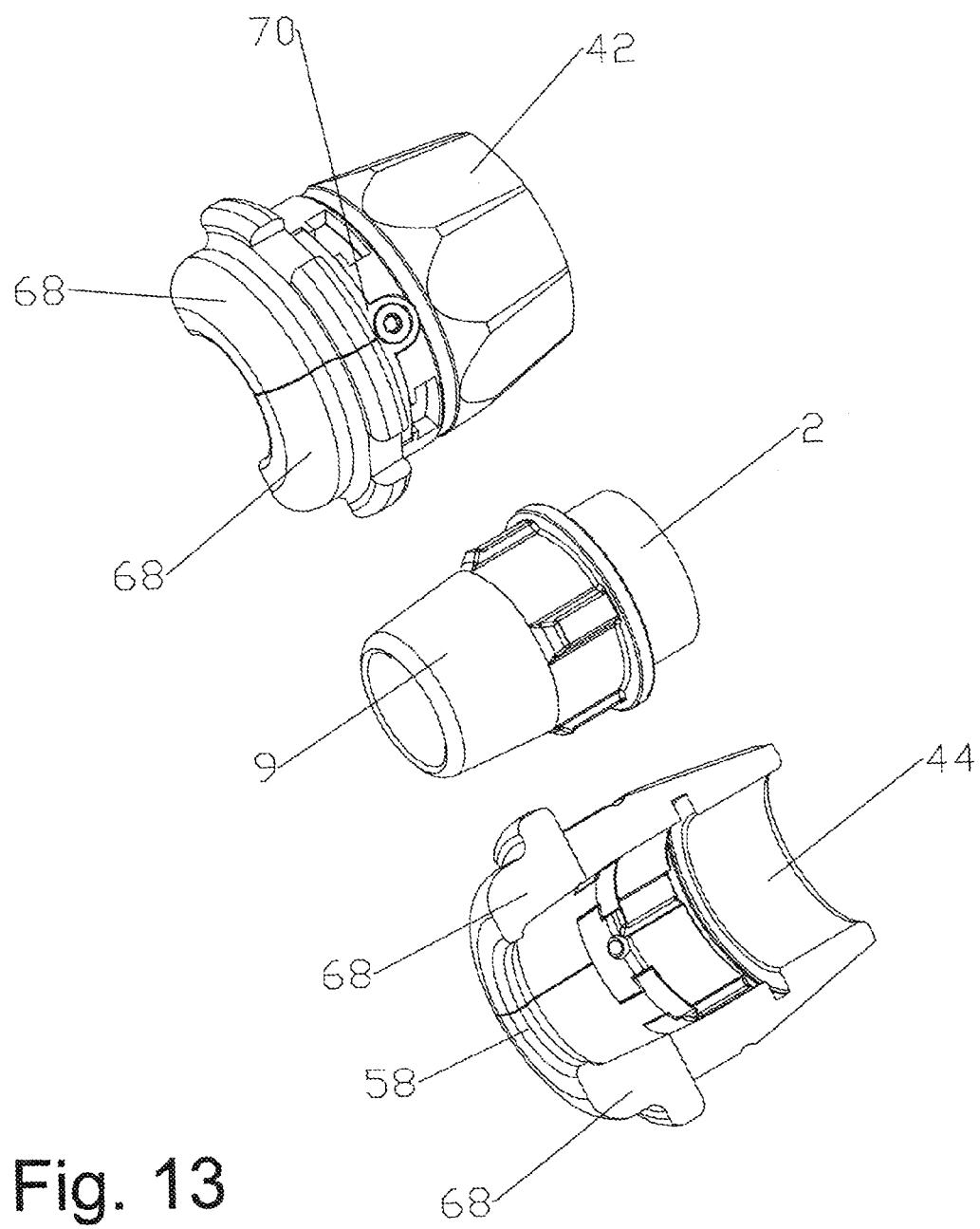
FIG. 13 is a schematic isometric view of a drive collet and corresponding coaxial connector for use with the spin welder of FIG. 12.
Figure 14:
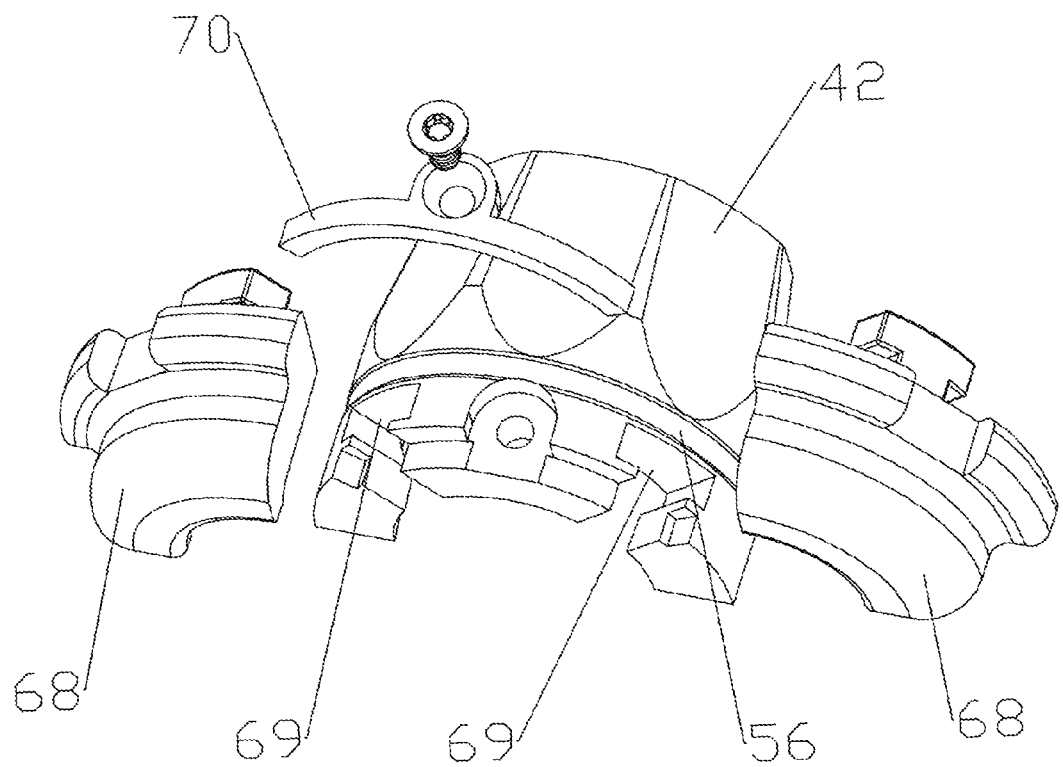
FIG. 14 is a schematic exploded isometric view of one portion of the first collet portion of FIG. 13.
Figure 15:
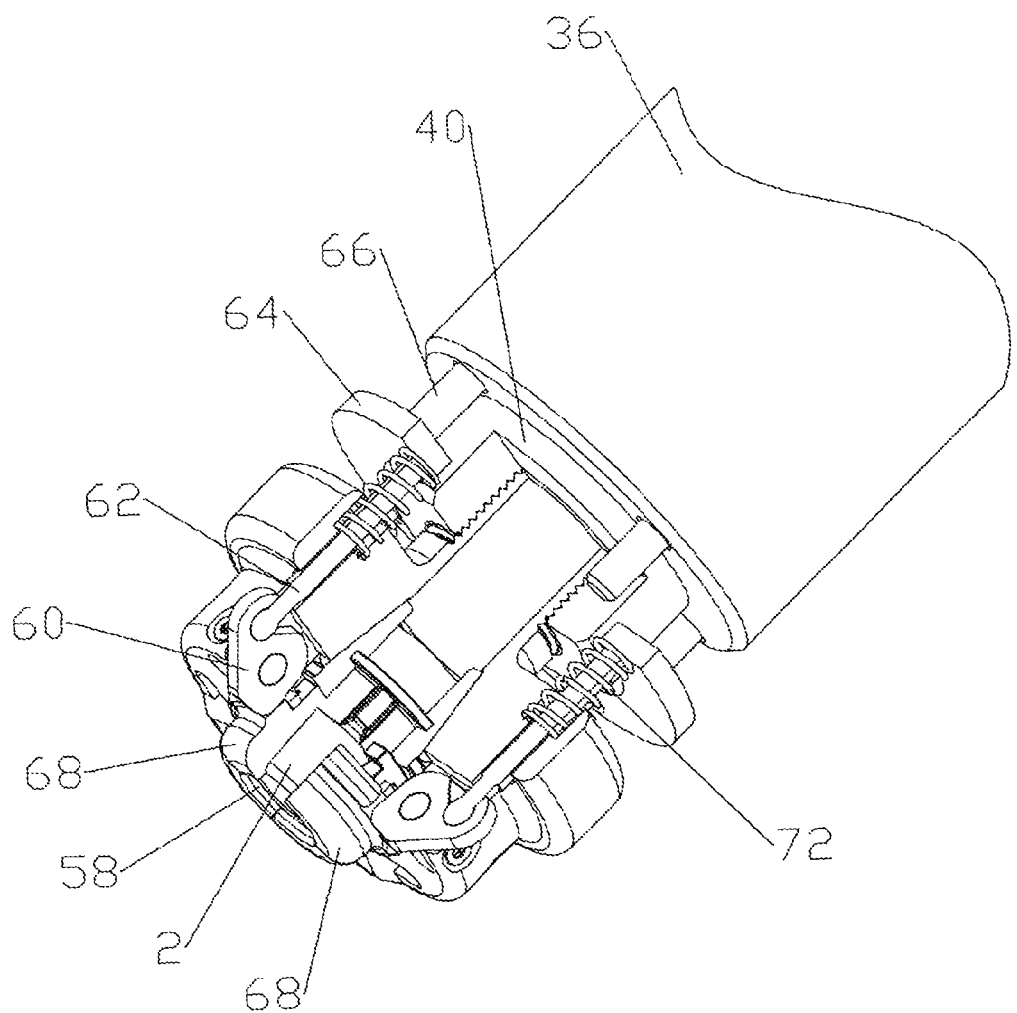
FIG. 15 is a partial cut-away schematic isometric view of the spin welder of FIG. 12, with the drive collet seated in the spindle socket.

As described with respect to the previous embodiment, the drive collet 32, as shown in FIGS. 13 and 14, may be similarly configured to enclose the coaxial connector 2. As best shown in FIG. 14, each of the first and second collet portions 42, 44 is provided with a pair of wedge portion 68 each slidable radially inward within respective wedge slot(s) 69. The wedge portion(s) may be retained at a minimum diameter by interference with one another and by a retaining arm 70 at a maximum diameter.

The interlocking portion 34 receives and retains the drive collet 32, enclosing the coaxial connector 2 therewithin, into the spindle socket 38. With the drive pins 66 retracted, the drive plate 64, biased toward an open position for example by one or more spring 72, is also retracted allowing the cam(s) 60 to release. Thereby, until the drive pins 66 are actuated, the wedge portion 68 are free to move out to the maximum diameter for ease of applying the drive collet 32 around the coaxial connector 2.

Figure 16:
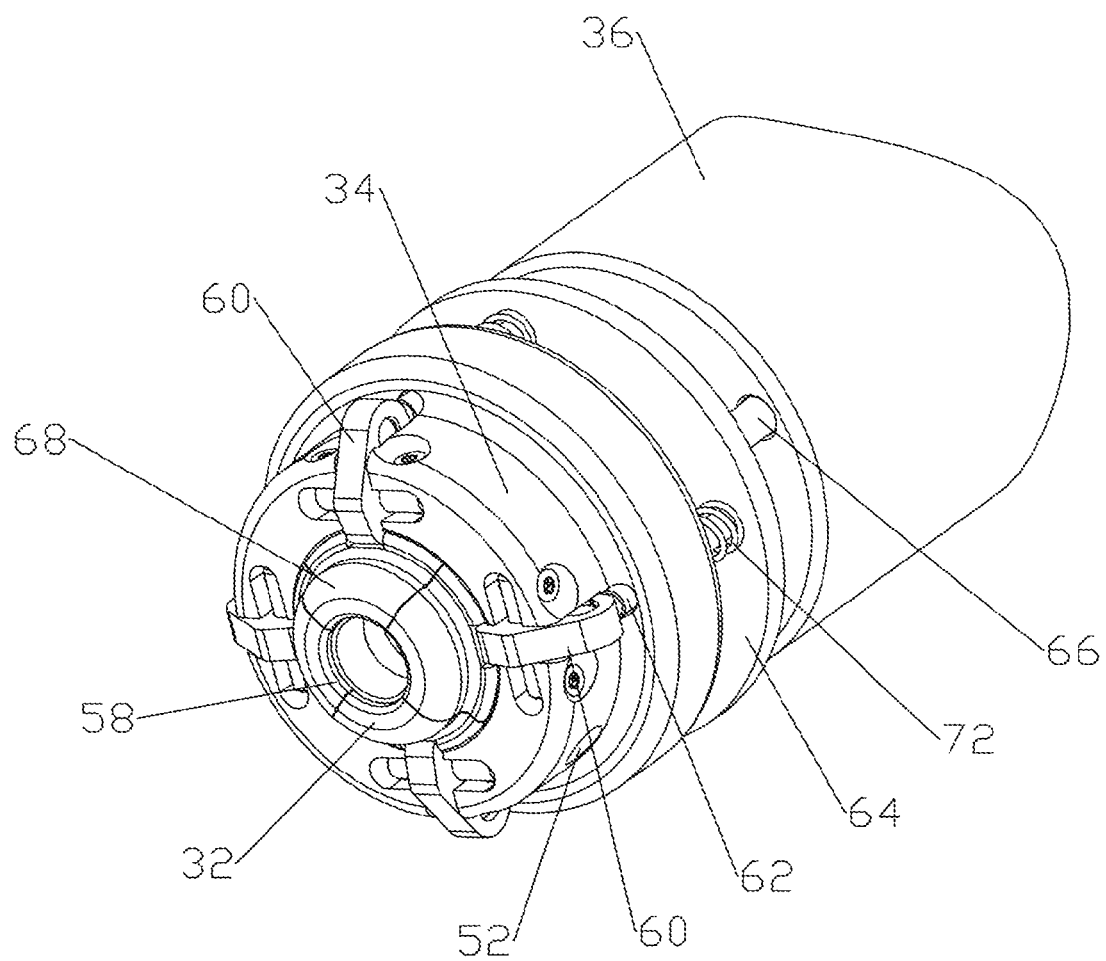
FIG. 16 is an external schematic isometric end view of FIG. 15.

During spin welding, initiating a longitudinal displacement of the drive pins 66 actuates the cam(s) 60 via the drive pin(s) 66 to drive the wedge portion(s) 68 radially inward towards the minimum diameter position, driving a desired portion of the polymer overbody 9 that may have been softened from heat generated along the friction surface 8 by spin welding, radially inward against the outer jacket 11. Because the wedge portion(s) 68 may be configured to interfere with one another at a minimum desired diameter, the travel of the wedge portion(s) 68 radially inward may be limited to a desired minimum diameter, for example as shown in FIG. 16, such as a diameter short of damaging the coaxial cable 6 and/or unacceptably deforming the overbody 9.

Because the radial inward displacement of the wedge portion(s) 68 may be actuated independently of the spin welder longitudinal position and/or a longitudinal force level thereagainst, the possibility of crush damage to the prepared end 4 of the coaxial cable 6 may be reduced.

One skilled in the art will appreciate that the invention may provide a cost efficient method and apparatus for increased quality of spin welds, especially where a cylindrical spin weld along a cylindrical surface with a significant longitudinal extent is desired. Further, the invention may improve spin weld result for simultaneous spin welding between material pairs with different material characteristics. When spin welding is performed along an extended cylindrical friction surface 8 and/or simultaneously performed between both polymer and metal mating surface pairs, the polymer surfaces are likely to reach a softening/melting point before the metal surfaces, increasing the likelihood that overheating between mating surfaces will occur. An overheated material may begin to further distort radially outward under the influence of centrifugal force. By the present invention, the dimensions and integrity of the cylindrical friction surface 8 are reinforced, reducing the likelihood of the softened polymer surfaces separating and/or deforming under the influence of centrifugal force.

| Table of Parts | |
|---|---|
| 2 | coaxial connector |
| 4 | prepared end |
| 6 | coaxial cable |
| 8 | friction surface |
| 9 | overbody |
| 10 | cable clamp |
| 11 | outer jacket |
| 12 | outer conductor |
| 13 | connector body |
| 14 | top cable clamp portion |
| 16 | bottom cable clamp portion |
| 18 | cable clamp base |
| 20 | hinge |
| 22 | actuator |
| 24 | stop |
| 26 | pivot end |
| 28 | attachment end |
| 30 | slot |
| 32 | drive collet |

-continued

Table of Parts

| | |
|---|---|
| 34 | interlocking portion |
| 36 | spin welder |
| 38 | spindle socket |
| 40 | spindle |
| 42 | first collet portion |
| 44 | second collet portion |
| 46 | interlock slot |
| 48 | support ridge |
| 50 | spring detent screws |
| 52 | spring detent screw aperture |
| 54 | ball bearing |
| 56 | detent groove |
| 58 | collet flange |
| 60 | cam |
| 62 | pivot pin |
| 64 | drive plate |
| 66 | drive pin |
| 68 | wedge portion |
| 69 | wedge slot |
| 70 | retaining arm |
| 72 | spring |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A spin weld apparatus for spin welding a prepared end of a coaxial cable with a coaxial connector, the spin weld apparatus comprising:
    a cable clamp dimensioned to grip the coaxial cable;
    a drive collet dimensioned to enclose a longitudinal extent of the coaxial connetor and rotationally interlock with a lateral surface of the coaxial connector;
    the drive collet dimensioned to rotationally interlock with an interlocking portion of a spin welder; and
    the spin welder dimensioned to axially align the coaxial connector with the coaxial cable for spin welding when the drive collet is rotationally interlocked with the spin welder.

2. The spin weld apparatus of claim 1, wherein the drive collet is provided with a first collet portion and a second collet portion; and
    the first collet portion separable from the second collet portion for seating the coaxial connector within the drive collet.

3. The spin weld apparatus of claim 1, wherein at least one end of the drive collet is provided with a flange extending radially inward, short of contacting the coaxial cable.

4. The spin weld apparatus of claim 1, wherein the interlocking portion is provided with a spindle socket dimensioned to receive and rotationally interlock with the drive collet; and
    the interlocking portion is coupled with a spindle of the spin welder.

5. The spin weld apparatus of claim 4, wherein the interlocking portion is provided with a plurality of spring detent screw apertures extending from an outer diameter to the spindle socket; and
    one of a plurality of spring detent screws is provided within each of the spring detent screw apertures.

6. The spin weld apparatus of claim 1, further including a stop for stopping the coaxial cable at a desired longitudinal position within the cable clamp.

7. The spin weld apparatus of claim 6, further including an actuator coupled with the stop; and
    the actuator operable to move the stop with respect to the cable clamp.

8. The spin weld apparatus of claim 7, wherein the stop is provided with a
    pivot end and an attachment end;
    the pivot end pivotally coupled with a cable clamp base;
    the attachment end removably coupled with the cable clamp base; and
    the stop stopping the coaxial cable when the attachment end is coupled with the cable clamp base.

9. The spin weld apparatus of claim 7, wherein the cable clamp is provided with a top cable clamp portion and a bottom cable clamp portion; and
    the top cable clamp portion movably coupled with the bottom cable clamp portion on one side.

10. The spin weld apparatus of claim 1, further including a plurality of cams coupled to the interlocking portion; the cams operable to drive a plurality of wedge portions of the drive collet radially inward.

11. The spin weld apparatus of claim 10, wherein each of the cams is coupled to a respective pivot pin; the pivot pins longitudinally displaceable by a drive plate;
    and the drive plate longitudinally displaceable by at least one drive pin coupled to the spin welder.

12. The spin weld apparatus of claim 10, wherein each of the wedge portions is radially slidable within a wedge slot of the drive collet.

13. The spin weld apparatus of claim 10, wherein the wedge portions interfere with each other to define a minimum inward travel of the wedge portions.

14. The spin weld apparatus of claim 10, wherein the wedge portions are retained upon the drive collet by at least one retaining arm.

* * * * *